UNITED STATES PATENT OFFICE.

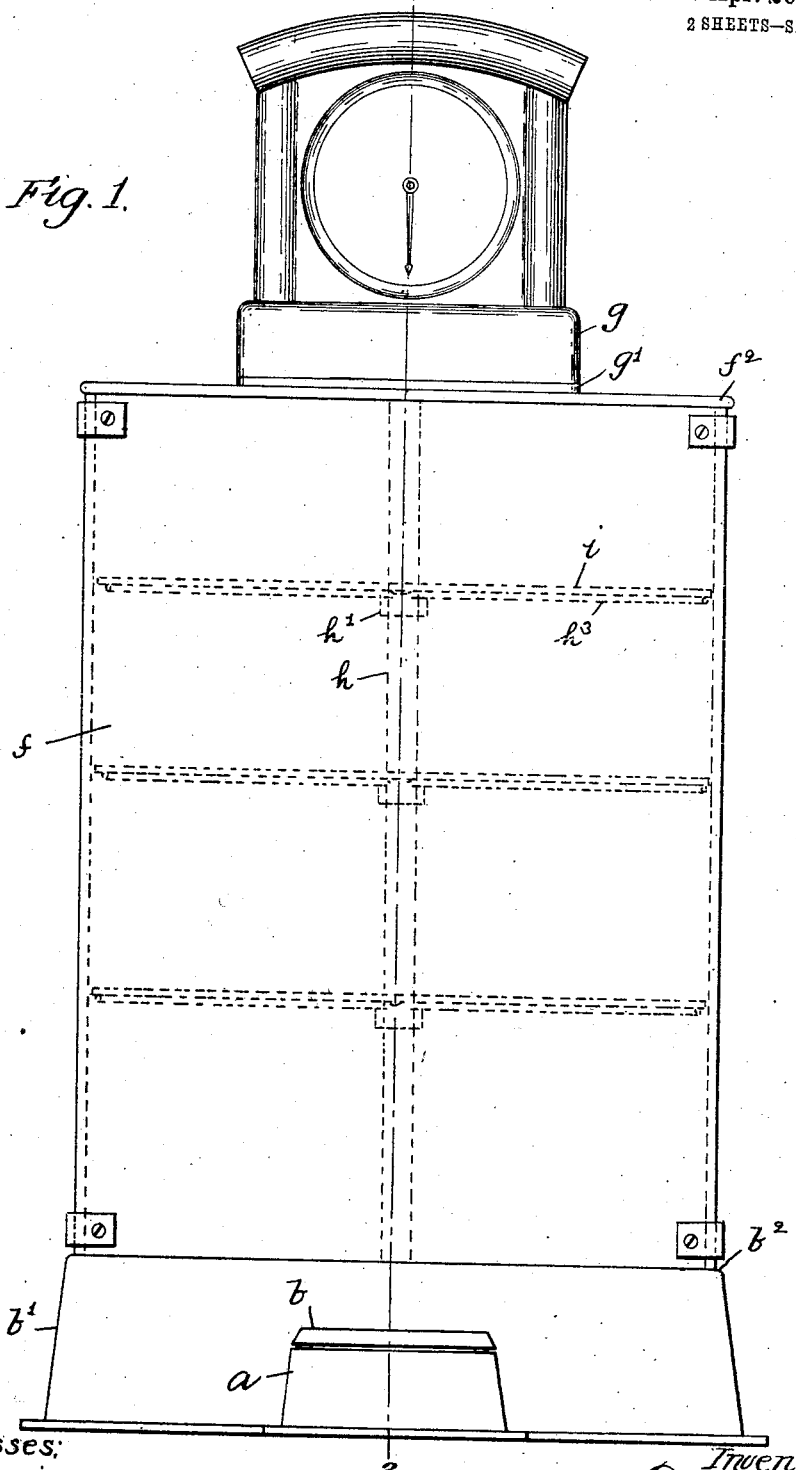

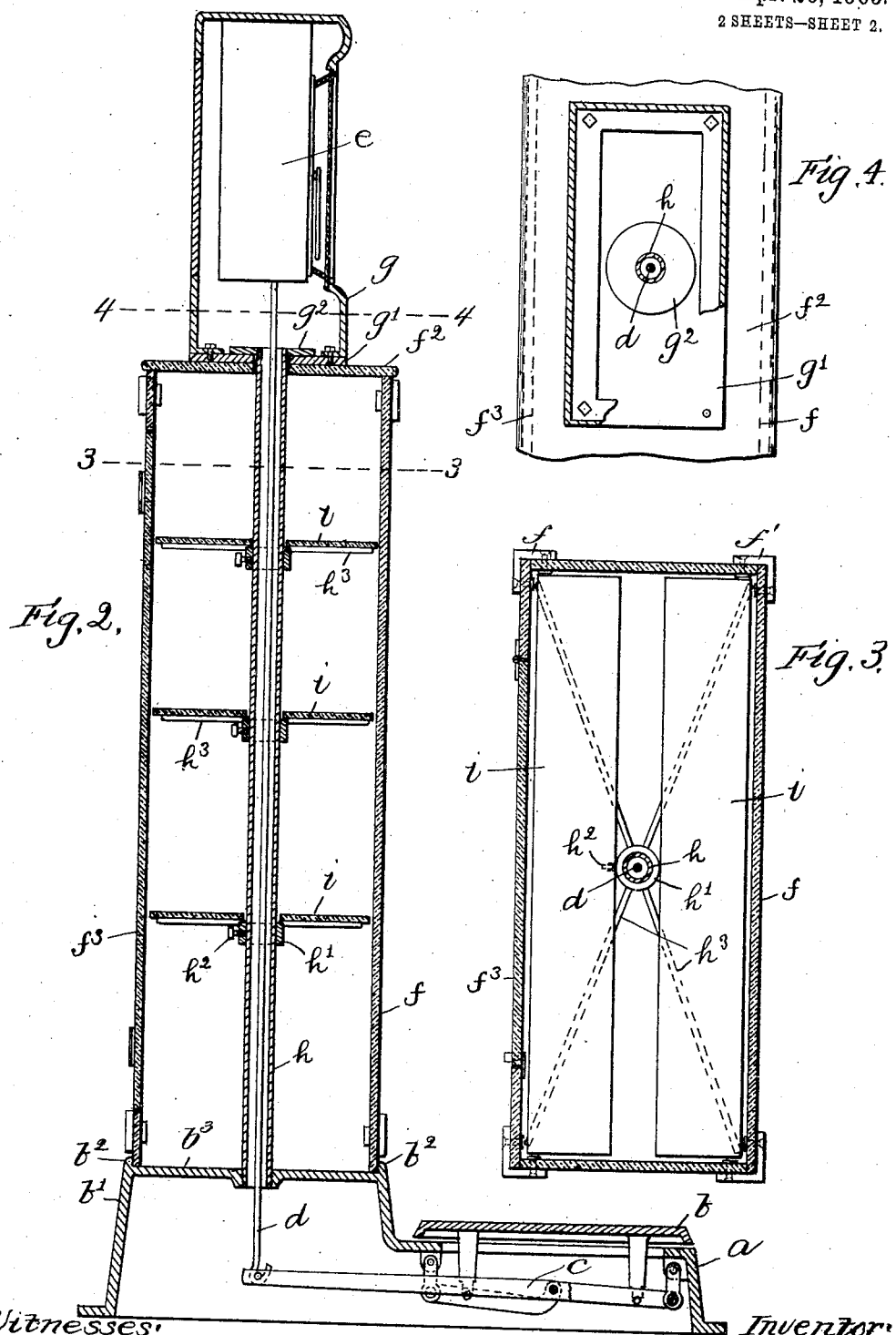

FREDERICK VERPLAST, OF BOSTON, MASSACHUSETTS.

AUTOMATIC WEIGHING-MACHINE.

No. 918,614.      Specification of Letters Patent.      Patented April 20, 1909.

Application filed November 11, 1907. Serial No. 401,636.

*To all whom it may concern:*

Be it known that I, FREDERICK VERPLAST, of Boston, county of Suffolk, State of Massachusetts, have invented an Improvement in Automatic Weighing-Machines, of which the following is a specification.

This invention relates to automatic weighing machines of the platform variety, and has for its object to provide the machine with a display-case by which articles of merchandise of various kinds may be displayed, said case being arranged to form a component part of the structure constituting the frame-work or case of the machine; and to provide for the free and unobstructed movement of the platform-rod which extends up through the display-case and which is connected with the indicating device which is located above said case; also to provide the machine base with an extension which supports the display-case and to provide said extension with a top plate which is adapted to serve as the bottom plate of the display-case and to provide the top plate of the extension and the top plate of the display-case, each with a hole through it for the platform-rod; also to provide means for securely holding the top plate of the display-case in fixed position with relation to the machine base; also to provide an upright tube, which, for its entire length, incloses the platform rod, and to provide said tube, at its opposite ends, with means for engaging the top plate of the extension and with means for engaging the top plate of the display case to thereby hold said plates in fixed relative positions; also to provide an upright tube which incloses the platform-rod for its entire length, and which is rigidly connected at its lower end to the top plate of the extension of the machine-base and which extends up through the hole in the top plate of the display-case and thereby holds said top plate in fixed position relative to the top plate of the extension.

Figure 1 shows in front elevation a weighing-machine embodying this invention. Fig. 2 is a vertical section of the machine, taken on the dotted line 2 Fig. 1. Fig. 3 is a horizontal section of the machine, taken on the dotted line 3—3 Fig. 2. Fig. 4 is a horizontal section of the machine, taken on the dotted line 4—4 Fig. 2.

$a$ represents the machine-base, $b$ the platform, $c$ the balancing levers supporting the platform, $d$ the upright vertically movable platform-rod, and $e$ the indicating-mechanism of an automatic weighing machine of any usual or suitable construction.

The machine-base $b$ is formed or provided with an extension $b'$ of any suitable shape and size for supporting the display-case, and said extension has a top plate $b^3$, formed integral with it or it may be otherwise rigidly connected with it, which serves as the bottom plate of the display case. As it is desired to provide a display case of quite large dimensions said extension $b'$ is herein shown as extended laterally in opposite ways from the main portion of the machine-base and also rearwardly therefrom. For the purpose of illustrating my invention the display-case herein shown consists of an upright structure supported on the extension $b'$ of the machine-base and made quadrangular, its four side walls being secured together at the corners by clips $f'$ or otherwise. The lower ends of the side walls enter a recess which is formed in the top of the extension $b'$ of the machine-base, so that the display case rests upon the top plate $b^3$. This recess is formed at the top of the extension $b'$ by providing said extension with an upwardly extended flange $b^2$ which surrounds the top plate $b^3$. The flange holds the lower ends of the side plates against lateral displacement. The upper end of the case is closed by a plate $f^2$, preferably of glass, which rests on top of the side walls $f$. This top plate is of considerable thickness in order that it may be used partially or wholly to support the head $g$ which incloses the indicating-mechanism. The top plate $b^3$ of the extension of the machine-base and the top plate $f^2$ of the display-case are each formed with a hole through it for the platform-rod $d$, said holes being arranged in vertical alinement. A tube $h$ extends from top to bottom of the display-case, which is preferably centrally disposed. It is rigidly connected at its lower end to the top plate $b^3$ of the extension of the machine-base, and rigidly supports against lateral movement the top plate of the display-case, that is to say, it holds the top plate of the display case in fixed position relative to the top plate of the extension. Its lower end extends into and preferably through a hole in the top plate $b^3$ of the extension of the machine-base and is rigidly connected with said plate by screwing it into said hole, hence the screw threads serve as a means on the tube for engaging the top plate of the extension. Its upper end extends up through the hole in the top plate $f^2$ of the display-case, and means connected with its upper end portion are employed for securely holding said top plate in fixed position. Said tube, for its entire length, incloses the platform-rod, and thereby protects it so that it has a free and unobstructed movement. As said tube is rigidly connected at its lower end to the top plate of the extension and is provided with means for engaging the top plate of the display-case, it serves to rigidly connect the top plate of the display-case with the machine-base and to thereby support it against lateral movement. By rigidly supporting the top plate of the display-case against lateral movement any strain exerted thereon incident to moving the machine from place to place will not act to strain and thereby crack the glass side walls.

It will be observed that the top plate $b^3$ on the extension of the machine base and tube $h$ rigidly connected thereto serve as and constitute an upright supporting-frame for the top-plate and side walls of the display case, which is connected with and supported by the extension of the machine base, and that said upright supporting-frame has a passage through it for the platform-rod, but my invention is not limited to the employment of this particular form of upright supporting-frame for display case.

It is very important to protect the platform-rod in order that it may have a free and unobstructed movement, for the reason that if movement of this rod is in the least obstructed the machine will not weigh accurately.

The platform-rod which extends through the tube from end to end is connected at its upper end in any usual manner, not shown, with the usual indicating-mechanism. The head $g$ which contains the indicating-mechanism is made hollow and has in its front side a circular opening for the dial. It is attached at its lower end to a plate $g'$ resting on the top plate $f^2$ of the display case.
The plate $g'$ has a hole through it for the projecting end of the tube $h$. A disk $g^2$ having an internally screw threaded hole through it, is screwed onto the externally screw-threaded end of the tube $h$ and engages the plate $g'$ and acts to clamp said plate $g'$ between itself and the plate $f^2$. The head $g$ is thereby securely held in place, and the top plate $f^2$ is held in engagement with the upper end of the tube $h$ and by means of said tube is held in fixed position.

On the tube $h$ at different points within the case, collars $h'$ are secured, preferably adjustably, by means of set-screws $h^2$ or otherwise. Arms $h^3$ of any desirable length, extend outward in different directions from these collars. The arms on each collar occupy a horizontal plane to thereby adapt them to support shelves $i$, which may be made of glass and which may merely rest on said arms. The shelves, any desired number of which may be employed, may be made of any shape or size. They are particularly well adapted to receive upon them different articles of merchandise which it is desired to display, but my invention comprehends the employment of any other form of displaying-devices contained in the display case for supporting the articles of merchandise for the purpose of displaying them, in lieu of the shelves herein shown.

One wall of the display case will be made as or provided with a door, represented at $f^3$, Fig. 2. By making all of the walls of the display case of glass the articles of merchandise may be seen by bystanders from all sides of the machine, yet by making merely the front wall of glass the articles may be seen by a person standing on the platform. Hence I prefer to make the display case practically entirely of glass. By making the top plate $f^2$ of glass a person standing on the platform may look down through it and see the articles from a different view point, but as the primary object of this plate is to assist in supporting the head which contains the indicating-mechanism it need not be made of glass.

Having thus described my invention, what I claim as new and desire to secure by Letters Patent is:—

1. A weighing-machine of the platform variety having a vertically movable platform-rod, a machine base having an extension, an upright supporting-frame thereon, vertical side walls of a display case supported by said extension, means for connecting said side walls together, a top plate above said side walls engaged by said supporting-frame and thereby held against lateral movement, and indicating-mechanism located above the top plate which is connected with the platform-rod, substantially as described.

2. A weighing-machine of the platform variety having a vertically movable platform-rod, a machine base having an extension, an upright supporting-frame thereon having a passage up through which the platform-rod extends, vertical side walls of a display case supported by said extension, means for connecting said side walls together, a top plate above said side walls engaged by said supporting-frame and thereby held against lateral movement, and indicating-mechanism located above said top plate which is connected with the platform-rod, substantially as described.

3. A weighing-machine of the platform variety having a vertically movable platform-rod, a machine base having an extension, vertical side walls of a display case extending upwardly from said extension, means for connecting said side walls together, a top plate above said side walls, means engaging said top plate and rigidly connected with the extension on the machine base for holding said top plate against lateral movement, and indicating-mechanism located above said top plate which is connected with the platform-rod, substantially as described.

4. A weighing-machine of the platform variety having a vertically movable platform-rod, a machine base having an extension provided with a support for a display case and having an upwardly extending flange surrounding said support, vertical side walls of a display case resting upon said support and held against lateral displacement by said flange, means for connecting said side walls together, a top plate on said side walls up through which said platform-rod extends and means connected with the extension of the machine base for holding said top plate against lateral movement, substantially as described.

5. In an automatic weighing machine of the platform variety having a vertically movable platform-rod, a machine-base having an extension, a top plate thereon having a hole through it for the platform rod, vertical side walls of a display case extending upwardly from said top plate, means for connecting said side walls together, and a top plate on said side walls also having a hole through it for the platform-rod, substantially as described.

6. In an automatic weighing machine of the platform variety having a vertically movable platform-rod, a machine-base having an extension, a top plate thereon having a hole through it for the platform-rod, vertical side walls of a display case extending upwardly from said top plate, means for connecting said side walls together, a top plate on said side walls also having a hole through it for the platform rod, and means engaging said top plates for holding them in fixed relative positions, substantially as described.

7. In an automatic weighing machine of the platform variety having a vertically movable platform-rod, a machine-base having an extension, a top plate thereon having a hole through it for the platform-rod, vertical side walls of a display case extending upwardly from said top plate, means for connecting said side walls together, a top plate on said side walls also having a hole through it for the platform-rod, and means engaging the central portions of said top plates for holding them in fixed relative positions and for protecting the platform-rod, substantially as described.

8. In an automatic weighing machine of the platform variety having a vertically movable platform-rod, a machine-base having an extension, a top plate thereon having a hole through it for the platform-rod, vertical side walls of a display case extending upwardly from said top plate, means for connecting said side walls together, a top plate on said side walls also having a hole through it for the platform-rod, and a vertical tube having means at its opposite ends for engaging the central portions of said plates for holding them in fixed relative positions, which, for its entire length, incloses the platform-rod, substantially as described.

9. In an automatic weighing machine of the platform variety having a vertically movable platform rod, a machine-base, an extension on said base provided with a top plate having a hole through it for the platform-rod, side walls of a display case extending upwardly from said extension, means for connecting said side walls together, a top plate on said side walls also having a hole through it for the platform rod, an upright tube inclosing said rod which is rigidly connected at its lower end to the top plate of the extension, and means connected with the upper end portion of said tube, for engaging the top plate on the side walls to thereby hold it in fixed position, substantially as described.

10. In an automatic weighing machine of the platform variety having a vertically movable platform-rod, a machine-base, an extension on said base provided with a top plate having a hole through it for the platform-rod, side walls of a display case extending upwardly from said extension, means for connecting said side walls together, a top plate on said side walls also having a hole through it for the platform-rod, and an upright tube inclosing said rod which is rigidly connected at its lower end to the top plate of the extension and which extends up through the hole in the top plate on the side walls and holds said plate against lateral movement relative to the aforesaid top plate, substantially as described.

In testimony whereof, I have signed my name to this specification, in the presence of two subscribing witnesses.

FREDERICK VERPLAST.

Witnesses:
B. J. NOYES,
H. B. DAVIS.